Patented May 1, 1945

2,374,835

UNITED STATES PATENT OFFICE 2,374,835

METHOD FOR THE PRODUCTION OF HEMI-BASIC CALCIUM HYPOCHLORITE

Homer Louis Robson, Lewiston, N. Y., assignor to The Mathieson Alkali Works, Inc., New York, N. Y., a corporation of Virginia No Drawing. Application November 14, 1940,
Serial No. 365,651

13 Claims. (Cl. 23—86)

This invention relates to the production of hemibasic calcium hypochlorite, $$Ca(OCl)_2 \cdot \tfrac{1}{2}Ca(OH)_2$$

and provides a method whereby large, easily filterable, well formed crystals of this material substantially free of other forms of basic calcium hypochlorite, such as the dibasic form, $$Ca(OCl)_2 \cdot 2Ca(OH)_2$$

may be produced.

Hemibasic calcium hypochlorite, which crystallizes in the form of sword-like acicular crystals, and in accordance with previously proposed methods of production in fine, difficulty filterable, needle-like crystals, has hertofore frequently been referred to as "slightly basic" or "⅔ basic" calcium hypochlorite. Analysis of the crystals made by the process of my invention, however, has established that the correct composition of the hemibasic form is represented by the formula $Ca(OCl)_2 \cdot \tfrac{1}{2}Ca(OH)_2$.

Hemibasic calcium hypochlorite in a particularly desirable, easily filterable, well defined crystalline form is produced in accordance with my invention by mixing substantially completely chlorinated lime, i. e. neutral calcium hypochlorite, and dibasic calcium hypochlorite in the presence of an aqueous medium, and maintaining the temperature of the mixture within the range of about 40° C. to about 80° C. during the precipitation of the hemibasic product. A preferred range of temperature for carrying out the process, particularly in large scale operation, is between about 40° C. and about 55° C. The reaction mixture of the present invention is in the form of an aqueous suspension of the reactants, and the neutral hypochlorite, dibasic hypochlorite, and seed crystals of hemibasic hypochlorite when the latter are employed, may with advantage be supplied to the reaction in the form of slurries, sludges, filter cakes, or centrifuged crystals. It is to be understood that when I refer herein and in the claims to the addition of one of the reactants to the reaction mixture or to the formation of a suspension of a reactant, reference is had to the use of the reactant in one of the just recited forms.

It has already been proposed to prepare calcium hypochlorite in the hemibasic form by a carefully controlled chlorination of lime slurries, or by the addition of a lime slurry to a slurry of completely chlorinated milk of lime in the presence of seed crystals of the hemibasic compound. The product resulting from such methods has numerous disadvantages including a tendency toward excessive fineness. Furthermore the fine needle-like crystals so produced contain undesirable proportions of solid impurities such as lime, dibasic calcium hypochlorite and insoluble matter such as calcium carbonate, and are with great difficulty rendered free of mother liquor.

Hemibasic calcium hypochlorite produced by chlorination frequently contains varying proportions of the neutral hypochlorite. A pure hemibasic form is, however, preferable, since the product is anhydrous and in general slurries of the hemibasic form have a better filterability. In the chlorination of lime slurries, for example in the chlorination of a suspension of one part $Ca(OH)_2$ in 2.5 parts of water at about 35° C., the first solid phase formed is dibasic hypochlorite. Further controlled chlorination of such a dibasic suspension, either with or without the removal of some of the liquid phase, or further chlorination of the solid phase removed from the original solution and resuspended in water or in a suitable mother liquor such as for example a solution of calcium hypochlorite and calcium chloride, will give a hemibasic product. Still further chlorination will cause the hemibasic product to redissolve with the formation of neutral hypochlorite in the form of a hydrate, $$Ca(OCl)_2 \cdot 2H_2O$$

It is known that in the chlorination method the reaction temperature has an influence on the size of the hemibasic crystals produced. For example, at 20° C. small crystals approximately 10 microns long, 1 to 2 microns wide and less than 1 micron in thickness are obtained. Between 35° C. and 45° C. larger crystals may be obtained, and it has been my experience that at 45° C., by seeding with properly shaped hemibasic crystals and with proper attention to the ratio of liquor to solids, crystals 0.5 to 1.0 mm. in length and up to 100 microns in width may be obtained. It is also true, however, that with such increased temperatures, decomposition of dissolved calcium hypochlorite increases at a rapid rate, and, at temperatures above 45°–50° C., decomposition is so rapid that operations at such temperatures are impractical. In spite of many operational precautions, such as the preparation of very small and thin dibasic crystals to increase the rate of solution and thus the chlorination rate, the use of mother liquor from previous operations, and rapid stirring controlled in a manner appropriate to prevent the trapping of gas bubbles in the slurry with a resulting thickening and interference with crystal growth, the decomposition rate is still so high at temperatures above about 45° C. that the preparation of the resulting desirable large crystals is not possible in a commercial operation.

The production of hemibasic hypochlorite by adding a milk of lime slurry to completely chlorinated lime slurries also does not produce a satisfactory form of hemibasic crystal. Crystals produced by this method are of mixed sizes, the greatest proportion being small crystals below 50 microns in length. The average crystalline size may be increased somewhat by employing increased temperatures, but I have found that the crystals are not rendered suitable for commercial filtration by operations conducted at temperatures up to 60° C.

In accordance with my invention, crystals of hemibasic calcium hypochlorite, which are larger and more easily filterable than those made by the referred to methods, are produced at reaction temperatures higher than those permissible with such previous methods, and furthermore the hypochlorite decomposition is substantially reduced. A number of procedural variations are possible in carrying out the process of my invention, but as previously stated the process comprises mixing neutral calcium hypochlorite and dibasic calcium hypochlorite in an aqueous medium and precipitation of hemibasic hypochlorite at a temperature within the range of about 40° C. to about 80° C. and preferably between about 40° C. and about 55° C. By such a method it is not necessary to chlorinate the slurry during the formation of the hemibasic product, and decomposition due to chlorination at temperatures sufficiently high to produce the desired crystal size is eliminated. Thus the step, which in the past has caused the greatest difficulty, i. e. chlorination to form hemibasic hypochlorite, is avoided. In small scale operations, where separation may be effected immediately after completion of crystal growth, large and well formed crystals may be prepared at temperatures up to about 80° C., while in large scale plant operations, where due to manipulative steps some delay must occur before centrifuging or filtration, reaction temperatures are preferably maintained at values not substantially above about 55° C. Operating at such temperatures, decomposition can be held well within the permissible limit of 5–7% of the available chlorine content of the slurry, and furthermore operating at lower temperatures, 40°–45° C. for example, in cases where slightly smaller crystal size is satisfactory, my process produces crystals as good or better than those produced by previous methods, and does so with negligible decomposition, and without producing the froth characteristic of the chlorination method within this temperature range.

The neutral and dibasic hypochlorite used in my process may be prepared by known methods of chlorination. The substantially completely chlorinated lime slurry, for example, may be prepared at ordinary temperatures, such as 15°–30° C., and with less than 1% decomposition of the hypochlorite. In the preparation of the dibasic hypochlorite by controlled chlorination of a lime slurry, the chlorination is advantageously carried out at 35°–40° C.

The process of my invention may be carried out by adding a slurry, sludge, filter cake, centrifuge cake or crystals of neutral hypochlorite to a slurry of dibasic hypochlorite, or the reverse order may be followed and a slurry, sludge, filter cake, centrifuge cake or crystals of dibasic hypochlorite added to a slurry of neutral hypochlorite. The starting slurry to which the second reactant is to be added may advantageously be diluted with a solution containing calcium hypochlorite which is preferably a mother liquor from a previous operation, such as from the precipitation of hemibasic hypochlorite or from the chlorination to produce the neutral hypochlorite. Such mother liquor may if desired be heated before being used as a diluent, or the suspension of the neutral or dibasic hypochlorite may be heated prior to the addition of the dibasic or neutral hypochlorite. After the reactants have been combined, for example at temperatures between about 35° C. and 50° C., the mixture may with particular advantage then be heated with effective stirring to a temperature approximating 50° to 55° C. and maintained at such a temperature during precipitation of the hemibasic product. Efficient stirring should be maintained throughout the mixing, heating and precipitation stages. Seed crystals of hemibasic hypochlorite in amounts up to about 10% of the expected yield may advantageously be added to the reaction mixture. Proportions of seed crystals as high as 10% are in general advisable only in cases where the mixing of the reactants is accomplished at relatively low temperatures. The addition of seed crystals may be made to the slurry or suspension of one of the reactants and the second reactant added, or seed crystals may be suspended in a mother liquor from a previous operation and both reactants thereafter added to the suspension. For example, a mother liquor from a previous precipitation of hemibasic product may be heated to a temperature approximating 40° C. and the neutral hypochlorite suspended therein, seed crystals of the hemibasic added, the dibasic hypochlorite added, and the mixture heated with stirring to a temperature approximating 50°–55° C. until the desired yield of hemibasic is precipitated, after which the mixture may be centrifuged. Alternatively the seed crystals may be added directly to the mother liquor before the addition of reactants as in Example III given below. In some instances seeding is of particular value in aiding the formation of large, easily filterable hemibasic crystals, and will serve to prevent the caking of the dibasic filter cake due to formation of hemibasic crystals around aggregations of dibasic crystals.

In an aqueous medium in equilibrium with the hemibasic compound, three moles of solid neutral calcium hypochlorite dihydrate will react with one mole of dibasic calcium hypochlorite to yield four moles of the hemibasic compound, in accordance with the reaction:

$$3Ca(OCl)_2 . 2H_2O + Ca(OCl)_2 . 2Ca(OH)_2 \rightarrow 4[Ca(OCl)_2 . \tfrac{1}{2}Ca(OH)_2] + 6H_2O$$

However, as indicated by the examples given below, it is desirable, in commercial operations, to use an excess of the solid neutral calcium hypochlorite.

Important economies may be effected by recovering a major portion of the available chlorine content of the mother liquor following separation of the hemibasic hypochlorite. This may be accomplished by adding lime or milk of lime to the mother liquor to precipitate the hypochlorite in the dibasic form. After separation this product may be employed in the preparation of further quantities of the hemibasic form.

The process of my invention will be illustrated by the following detailed examples, but it is to be understood that the invention is not limited thereto.

Example I

A smooth paste prepared from 52 lbs. of lime and 115 lbs. of water was chlorinated until the free lime content of the mixture had been reduced to 0.2%. This chlorination consumed approximately 47 lbs. of chlorine and resulted in the production of neutral calcium hypochlorite. 25 lbs. of lime in 55 lbs. of water were separately chlorinated with 15½ lbs. of chlorine at a temperature of 35°–40° C. to obtain a slurry of dibasic hypochlorite. 200 lbs. of mother liquor from a previous operation, containing 10.8% $Ca(OCl)_2$ and 18.8% $CaCl_2$, were placed in a steam-jacketed kettle and brought to 45° C. The slurry of substantially completely chlorinated lime was then added to the kettle, and when the temperature had reached 45° C. the dibasic slurry added. The entire mixture during a period of 10 minutes was raised to a temperature of 55° C. and the resulting slurry centrifuged. 57.5 lbs. of hemibasic centrifuge cake were obtained analyzing 60% calcium hypochlorite. After drying in a current of heated air the product analyzed as follows: $Ca(OCl)_2$ 68.6%, $Ca(ClO_3)_2$ 0.2%, $CaCO_3$ 4.2%, $Ca(OH)_2$ 18.4%, $CaCl_2$ 8.1% and water 0.5%. 450 lbs. of mother liquor containing 10.5% $Ca(OCl)_2$ remained. This liquor was treated with lime and the $Ca(OCl)_2$ content reduced to about 4% by precipitating basic calcium hypochlorite which, after discarding the supernatant liquid, was employed in subsequent operations.

Example II 77 lbs. of lime and 170 lbs. of water were made into a slurry and chlorinated with 42 lbs. of chlorine with suitable stirring at 35°–40° C. After settling, 142 lbs. of clear supernatant liquid containing about 6% $Ca(OCl)_2$ were discarded, leaving 147 lbs. of dibasic sludge containing 20% by weight of lime in the form of dibasic hypochlorite.

The dibasic sludge was divided into two parts. To 110 lbs. of sludge 75 lbs. of water were added and the resulting slurry chlorinated at 15°–20° C. until the free lime content had been reduced to 0.2%. The resulting neutral hypochlorite slurry was diluted with 300 lbs. of a mother liquor from a previous operation containing 11% $Ca(OCl)_2$ and 18.5% $CaCl_2$, and the mixture heated in a kettle to 40° C. The 37 lbs. of dibasic sludge left from the original chlorination were added to the kettle and the temperature increased to 55° C. during a period of 15 minutes. Centrifuging this slurry produced 58 lbs. of cake which on drying yielded a product containing 68.5% calcium hypochlorite and having an analysis similar to the product obtained in Example I.

Example III 77 lbs. of lime were suspended in 170 lbs. of water and chlorinated as in the preceding example. The settled dibasic sludge was centrifuged yielding 71½ lbs. of dibasic centrifuge cake analyzing as follows: $Ca(OCl)_2$ 40%, $Ca(OH)_2$ 41.2%, $CaCl_2$ 2.8%, $CaCO_3$ 1%, water 15%.

177 lbs. of lime were suspended separately in 338 lbs. of water and chlorinated until the free lime content had been reduced to 0.1%. During the chlorination the temperature was maintained at 30°–35° C. until 100 lbs. of chlorine had been added, after which the temperature was reduced to 15°–20° C.

700 lbs. of mother liquor from a previous operation containing approximately 10.8%

$Ca(OCl)_2$ and 18.8% $CaCl_2$ were placed in a kettle and heated to 45° C. 100 lbs. of hemibasic slurry from a previous operation were added as seed crystals. The 677 lbs. of completely chlorinated neutral slurry were then added and the mixture stirred and heated until the temperature had reached 40° C. The dibasic centrifuge cake was quickly added and rapidly dispersed throughout the slurry by means of stirring arms sweeping the bottom of the kettle. The temperature rose to 45° C. in the course of a few minutes and was then increased to 55° C. during approximately 10 minutes. The mixture was held at approximately 55° C. for another 4 minutes, after which time the mixture was centrifuged. The centrifuge cake contained 60.5% $Ca(OCl)_2$ and after drying a product containing 69% $Ca(OCl)_2$ was obtained.

While in large scale operations filtration may be employed to effect the separation of the hemibasic hypochlorite, I prefer to centrifuge the slurry as soon as crystallization has proceeded sufficiently to give the desired yield. In commercial operations it is advantageous to start the centrifuging operation when 90% to 95% of the equilibrium yield has been achieved, some further crystallization normally taking place in the interval between completion of the stirring and actual separation of the liquid and solid phases in the centrifuge.

I claim:

1. In a process for the production of well-formed, easily filterable crystals of hemibasic calcium hypochlorite having the formula $$Ca(OCl)_2 \cdot \tfrac{1}{2}Ca(OH)_2$$

the improvement which comprises mixing, in the presence of an aqueous medium, neutral calcium hypochlorite and dibasic calcium hypochlorite in such proportions that a major portion of the solids present are converted into hemibasic calcium hypochlorite on heating, and maintaining the temperature of the mixture without chlorination within the range of approximately 40° C. to 80° C. until the major portion of the solids have been converted into hemibasic calcium hypochlorite.

2. In a process for the production of well-formed, easily filterable crystals of hemibasic calcium hypochlorite having the formula $$Ca(OCl)_2 \cdot \tfrac{1}{2}Ca(OH)_2$$

the improvement which comprises mixing, in the presence of an aqueous medium, neutral calcium hypochlorite and dibasic calcium hypochlorite in such proportions that a major portion of the solids present are converted into hemibasic calcium hypochlorite on heating, and maintaining the temperature of the mixture without chlorination within the range of approximately 40° C to 55° C. until the major portion of the solids have been converted into hemisbasic calcium hypochlorite.

3. In a process for the production of well-formed, easily filterable crystals of hemibasic calcium hypochlorite having the formula $$Ca(OCl)_2 \cdot \tfrac{1}{2}Ca(OH)_2$$

the improvement which comprises mixing, in the presence of an aqueous medium, neutral calcium hypochlorite and dibasic calcium hypochlorite in such proportions that a major portion of the solids present are converted into hemibasic calcium hypochlorite on heating, adding seed crystals of hemibasic calcium hypochlorite, and maintaining the temperature of the mixture within the range of about 40° C. to about 55° C. until the major portion of the solids have been converted into hemibasic calcium hypochlorite.

4. In a process for the production of well-formed, easily filterable crystals of hemibasic calcium hypochlorite having the formula

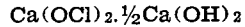

the improvement which comprises heating an aqueous suspension of dibasic calcium hypochlorite to a temperature within the range of approximately 40° C. to 55° C., adding neutral calcium hypochlorite in an amount such that a major portion of the solids of said aqueous suspension and the added neutral calcium hypochlorite are converted, on heating, into hemibasic calcium hypochlorite, and maintaining the temperature of the mixture within said range without chlorination concurrently with stirring until the major portion of the solids have been converted into hemibasic calcium hypochlorite.

5. In a process for the production of well-formed, easily filterable crystals of hemibasic calcium hypochlorite having the formula

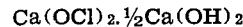

the improvement which comprises heating an aqueous suspension of dibasic calcium hypochlorite to a temperature in excess of about 35° C. but less than about 50° C., adding seed crystals of hemibasic calcium hypochlorite in an amount not greater than about 10% of the expected yield of the hemibasic hypochlorite, adding neutral calcium hypochlorite in an amount such that a major portion of the solids of said aqueous suspension and the added neutral calcium hypochlorite are converted, on heating, into hemibasic calcium hypochlorite, and heating the mixture to maintain the temperature between about 40° C. and about 55° C. concurrently with stirring until the major portion of the solids have been converted into hemibasic calcium hypochlorite.

6. In a process for the production of well-formed, easily filterable crystals of hemibasic calcium hypochlorite having the formula

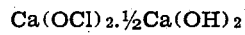

the improvement which comprises heating an aqueous suspension of neutral calcium hypochlorite to a temperature within the range of approximately 40° C. to 55° C., adding dibasic calcium hypochlorite in an amount such that a major portion of the solids of said aqueous suspension and the added dibasic calcium hypochlorite are converted, on heating, into hemibasic calcium hypochlorite, and maintaining the temperature of the mixture within said range without chlorination concurrently with stirring until the major portion of the solids have been converted into hemibasic calcium hypochlorite.

7. In a process for the production of well-formed, easily filterable crystals of hemibasic calcium hypochlorite having the formula

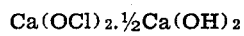

the improvement which comprises suspending neutral calcium hypochlorite in an aqueous solution containing calcium hypochlorite, heating the suspension to a temperature between approximately 40° C. and 50° C., adding dibasic calcium hypochlorite in an amount such that a major portion of the solids of said aqueous suspension and the added dibasic calcium hypochlorite are converted, on heating, into hemibasic calcium hypochlorite, and heating the mixture without chlorination to maintain the temperature between approximately 40 C. and 80° C. concurrently with stirring until the major portion of the solid have been converted into hemibasic calcium hypochlorite.

8. In a process for the production of well-formed, easily filterable crystals of hemibasic calcium hypochlorite having the formula

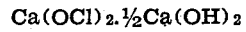

the improvement which comprises suspending neutral calcium hypochlorite in an aqueous solution containing calcium hypochlorite, heating the suspension to a temperature between about 40° C. and 50° C., adding dibasic calcium hypochlorite in an amount such that a major portion of the solids of said aqueous suspension and the added dibasic calcium hypochlorite are converted, on heating, into hemibasic calcium hypochlorite, adding seed crystals of hemibasic calcium hypochlorite to the mixture, and heating the mixture to maintain the temperature between about 40° C. and about 80° C. concurrently with stirring until the major portion of the solids have been converted into hemibasic calcium hypochlorite.

9. In a process for the production of well-formed, easily filterable crystals of hemibasic calcium hypochlorite having the formula

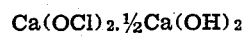

the improvement which comprises suspending neutral calcium hypochlorite in an aqueous solution containing calcium hypochlorite, heating the suspension to a temperature between approximately 40° C. and 50° C., adding dibasic calcium hypochlorite in an amount such that a major portion of the solids of the aqueous suspension and the added dibasic calcium hypochlorite are converted, on heating, into hemibasic calcium hypochlorite, heating the mixture to a temperature between approximately 50° C. and 55° C., and heating and stirring the suspension without chlorination until the major portion of the solids have been converted to hemibasic calcium hypochlorite.

10. In a process for the production of well-formed, easily filterable crystals of hemibasic calcium hypochlorite having the formula

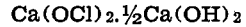

the improvement which comprises suspending dibasic calcium hypochlorite in an aqueous solution containing calcium hypochlorite, heating the suspension to a temperature between approximately 35° C. and 50° C., adding neutral calcium hypochlorite in an amount such that a major portion of the solids of the aqueous suspension and the added neutral calcium hypochlorite are converted, on heating, into hemibasic calcium hypochlorite, and heating the mixture without chlorination to maintain the temperature between approximately 40° C. and 80° C. concurrently with stirring until the major portion of the solids have been converted to hemibasic calcium hypochlorite.

11. In a process for the production of well-formed, easily filterable crystals of hemibasic calcium hypochlorite having the formula

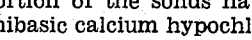

the improvement which comprises suspending dibasic calcium hypochlorite in an aqueous solution containing calcium hypochlorite, heating the suspension to a temperature between about 35° C. and about 50° C., adding seed crystals of hemibasic calcium hypochlorite, adding neutral calcium hypochlorite in an amount such that a major portion of the solids of the aqueous suspension and the added neutral calcium hypochlorite are converted, on heating, into hemibasic calcium hypochlorite, and heating the mixture to maintain the temperature between about 40° C. and about 80° C. concurrently with stirring until the major portion of the solids have been converted into hemibasic calcium hypochlorite.

12. In a process for the production of well-formed, easily filterable crystals of hemibasic calcium hypochlorite having the formula $$Ca(OCl)_2 \cdot \tfrac{1}{2}Ca(OH)_2$$

the improvement which comprises suspending dibasic calcium hypochlorite in an aqueous solution containing calcium hypochlorite, heating the suspension to a temperature between about 35° C. and about 50° C., adding seed crystals of hemibasic calcium hypochlorite, adding neutral calcium hypochlorite in an amount such that a major portion of the solids of said aqueous suspension and the added neutral compound are converted, on heating, into hemibasic calcium hypochlorite, and heating the mixture to maintain the temperature between about 50° C. and about 55° C. concurrently with stirring until the major portion of the solids have been converted into hemibasic calcium hypochlorite.

13. In a process for the production of well-formed, easily filterable crystals of hemibasic calcium hypochlorite having the formula $$Ca(OCl)_2 \cdot \tfrac{1}{2}Ca(OH)_2$$

the improvement which comprises heating an aqueous solution having dissolved therein calcium hypochlorite to a temperature approximating 40° C., suspending neutral calcium hypochlorite in said solution, adding seed crystals of hemibasic calcium hypochlorite to the suspension, adding dibasic calcium hypochlorite in an amount such that a major portion of the solids of the aqueous suspension and the added dibasic calcium hypochlorite are converted, on heating, into hemibasic calcium hypochlorite, and heating the mixture to maintain the temperature between about 50° C. and about 55° C. concurrently with stirring until the major portion of the solids have been converted into hemibasic calcium hypochlorite.

HOMER LOUIS ROBSON.